Nov. 26, 1929. J. P. LAVAUD 1,737,504
DOUBLE FINGERS FOR MOWING MACHINES
Filed July 23, 1925

Patented Nov. 26, 1929

1,737,504

UNITED STATES PATENT OFFICE

JEAN PAUL LAVAUD, OF CIVRAY, FRANCE

DOUBLE FINGERS FOR MOWING MACHINES

Application filed July 23, 1925, Serial No. 45,678, and in France November 26, 1924.

The invention refers to mowing machines and its object is to devise means permitting an easy adaptation of the same machine for different kinds of work, for different herbs.

In the ordinary mowing machines the finger bar with simple fingers is adapted especially for the artificial meadows. For short and soft herbs which cannot be cut by the ordinary mowing machines, mowing machines with finger bars (called Danish bars) with crowded fingers are employed. Owing to this fact, the farmers are obliged, in case that they possess artificial and natural meadows, to have two kinds of finger bars, the one with simple fingers for the artificial meadows and the other with crowded fingers for the natural meadows, which fact necessitates double expenses of purchase and keeping in order.

Now the present invention dispenses with this drawback, since it permits the transformation of the ordinary finger bar into a finger bar with crowded fingers suitable especially for cutting of short and soft herbs. This finger is mounted on the bar instead of the simple finger and with the same bolt of fixation, its dimensions being such that the fingers present a regular range after mounting.

The farmer can therefore with such double fingers, employ one single finger bar and transform the same in some instances into a finger bar with double fingers, simply by mounting on the bar the double fingers instead of the single fingers, whereby a great economy is obtained, since the heavy cost of purchase of a Danish bar is dispensed with.

The drawings appended represent, in the way of an example, one mode of execution of a double finger.

Figures 1, 2:
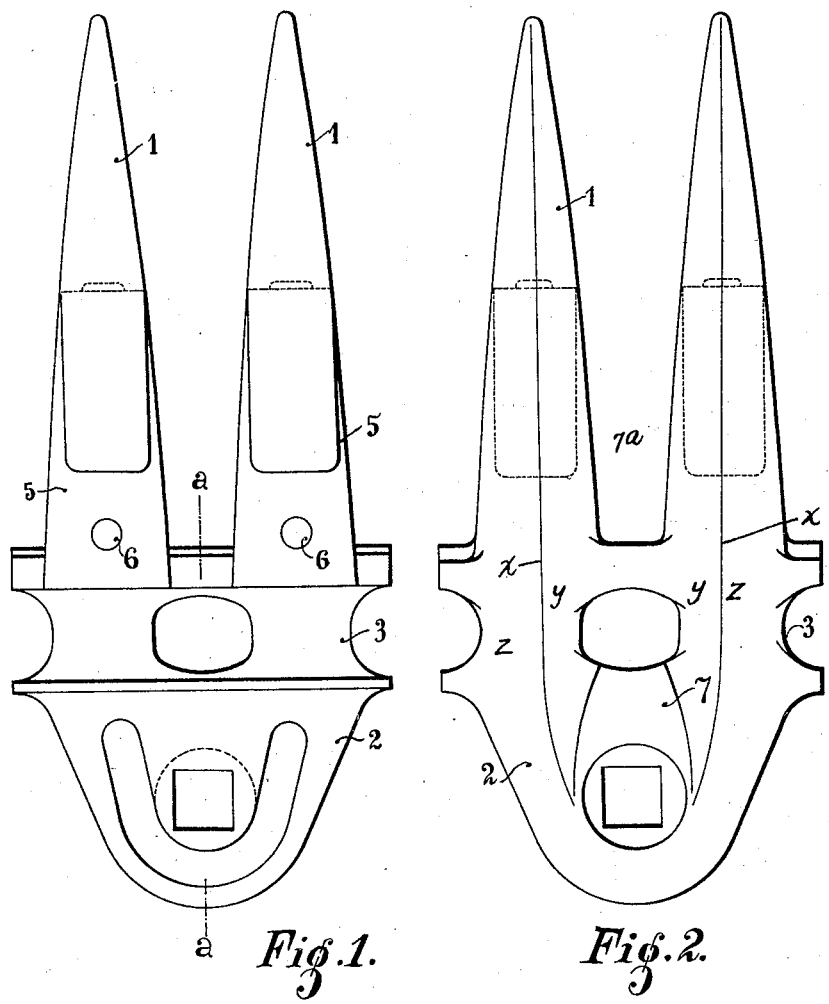
Figure 1 is a plan view.
Figure 2 is a plan view seen from below.
Figure 3:
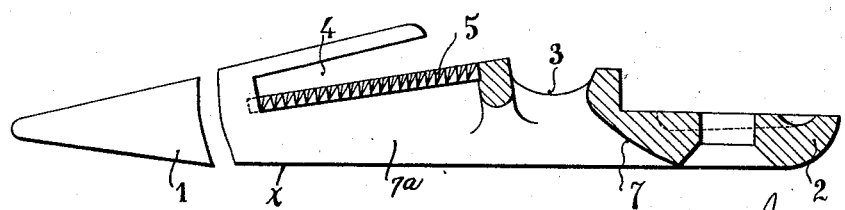
Figure 3 is a vertical section according to the lines a—a of Figure 1.

The device comprises two points or fingers 1 of forged steel or of cast-iron steel connected by a base 2 applying with a hollowed part 3 against the rod, where it can be fixed, instead of a single finger, by means of a bolt used equally for the fixation of the single finger.

The cutter bar with cutter plates of the usual size performs a to-and-fro motion in the gliding path provided by the grooves 4 in the thickness of the teeth 1, the whole forming a blade-support.

In order to facilitate the gliding of the cutter bar, the double finger is provided with a counterplate of steel 5 inserted into the body of the finger and riveted to the same at 6. In this way the counter-plates which can be replaced after wear assure an unlimited duration of the double finger, whereas the fingers of the Danish bar with crowded fingers have no such exchangeable counterplates.

The intervals existing between the fingers after the mounting of single fingers on the finger bar, permit an easy removal of any kind of remains accummulated by the rod gliding on the soil, in fact such accumulation is prevented, which produces a resistance against the gliding motion and inconveniences the cutting action. In order to avoid these drawbacks when employing the double fingers, a groove $7^a$ is provided according to the invention between the points and at their origin, the continuation of this groove being formed by an inclined wall 7 between the fingers of the base 2. The inclination of this wall is very pronounced, without any sharp edge or roughness. Owing to this fact, the finger bar working and gliding on the soil does not present any resistance sensibly greater against advance than the one present when using single fingers. On the other hand, if an obstacle, for example, a stone or a little knoll or the like is in the way, the greatly inclined face 7 permits an easy passage of the bar since it cannot hit against such obstacle. Finally, the fouling of the remains is avoided because they glide below the bar and do not provoke any inconveniences since they are not encountered by any wall susceptible to retain them and to cause their accumulation. Hence the gliding is easy and the cutting very regular.

With regard to the mounting of the double finger on the finger bar, it will suffice for the transformation of the same into a bar with crowded fingers to remove the single standard fingers and to replace them by double fingers, each double finger occupying on the bar the place of the single finger and being fixed there by the same bolt. In this manner a finger bar will be obtained which is specially adaptable for cutting or mowing, the after-grasses, short hay and soft herbs.

What I claim, is:—

1. In cutting apparatus for mowing machines, a base corresponding in width with a standard single finger base, said first named base being provided with a pair of spaced fingers and said first named base being arranged to be substituted for a standard finger base for use on a finger bar, said first named base presenting a rearwardly and downwardly inclined face in the rear of the fingers.

2. In cutting apparatus for mowing machines, a base corresponding in width with a standard single finger base, said first named base being provided with a pair of spaced fingers and a groove therebetween and said first named base being arranged to be substituted for a standard finger base for use on a finger bar, said first named base presenting a rearwardly and downwardly inclined face in the rear of the groove between the fingers, said face widening rearwardly and forming a rear continuation of said groove and each of the fingers presenting oppositely inclined downwardly converging longitudinal faces on their lower sides, certain of which extend to and the others of which extend beyond the first named inclined face.

In witness whereof I affix my signature.

JEAN PAUL LAVAUD.